(12) United States Patent
Shibasaki et al.

(10) Patent No.: US 7,088,389 B2
(45) Date of Patent: Aug. 8, 2006

(54) SYSTEM FOR DISPLAYING INFORMATION IN SPECIFIC REGION

(75) Inventors: Takao Shibasaki, Tokyo (JP); Yulchiro Akatsuka, Tama (JP); Akito Saito, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 665 days.

(21) Appl. No.: 09/951,872

(22) Filed: Sep. 13, 2001

(65) Prior Publication Data
US 2002/0145709 A1    Oct. 10, 2002

(30) Foreign Application Priority Data
Sep. 19, 2000    (JP) ............................. 2000-283293

(51) Int. Cl.
*H04N 5/262* (2006.01)
(52) U.S. Cl. .................. 348/239; 348/116; 348/222.1; 348/231.3; 348/333.02
(58) Field of Classification Search ................ 348/116, 348/207.1, 222.1, 231.3, 231.5, 239, 333.01, 348/333.02
See application file for complete search history.

(56) References Cited

U.S. PATENT DOCUMENTS

| | | | |
|---|---|---|---|
| 5,815,411 A * | 9/1998 | Ellenby et al. ............. | 702/150 |
| 6,037,936 A * | 3/2000 | Ellenby et al. ............. | 345/764 |
| 6,307,556 B1 * | 10/2001 | Ellenby et al. ............. | 345/427 |
| 6,396,537 B1 * | 5/2002 | Squilla et al. .............. | 348/239 |
| 6,437,797 B1 * | 8/2002 | Ota ............................. | 345/638 |
| 6,657,661 B1 * | 12/2003 | Cazier ...................... | 348/231.2 |
| 6,697,761 B1 * | 2/2004 | Akatsuka et al. ........... | 702/151 |
| 2002/0085111 A1 * | 7/2002 | Heiman .................. | 348/333.01 |

FOREIGN PATENT DOCUMENTS

| JP | 10-267671 A | 10/1998 |
|---|---|---|
| JP | 11-031238 A | 2/1999 |

* cited by examiner

*Primary Examiner*—David Ometz
*Assistant Examiner*—Chriss S. Yoder
(74) *Attorney, Agent, or Firm*—Frishauf, Holtz, Goodman & Chick, P.C.

(57) ABSTRACT

According to an embodiment of the present invention, a system for displaying information in a specific region includes a capturing unit for capturing a desired subject, an image capturing unit for capturing an image of the subject, a position and attitude calculating unit for calculating at least the position and the facing direction of the capturing unit on the basis of the captured image, a determining unit for determining the subject in the image captured by the image capturing unit on the basis of an output of the position and attitude calculating unit, a related information obtaining unit for obtaining at least information related to the determined subject, and a related information superimposition display unit for displaying the obtained information together with the image related to the subject on a display unit.

10 Claims, 3 Drawing Sheets

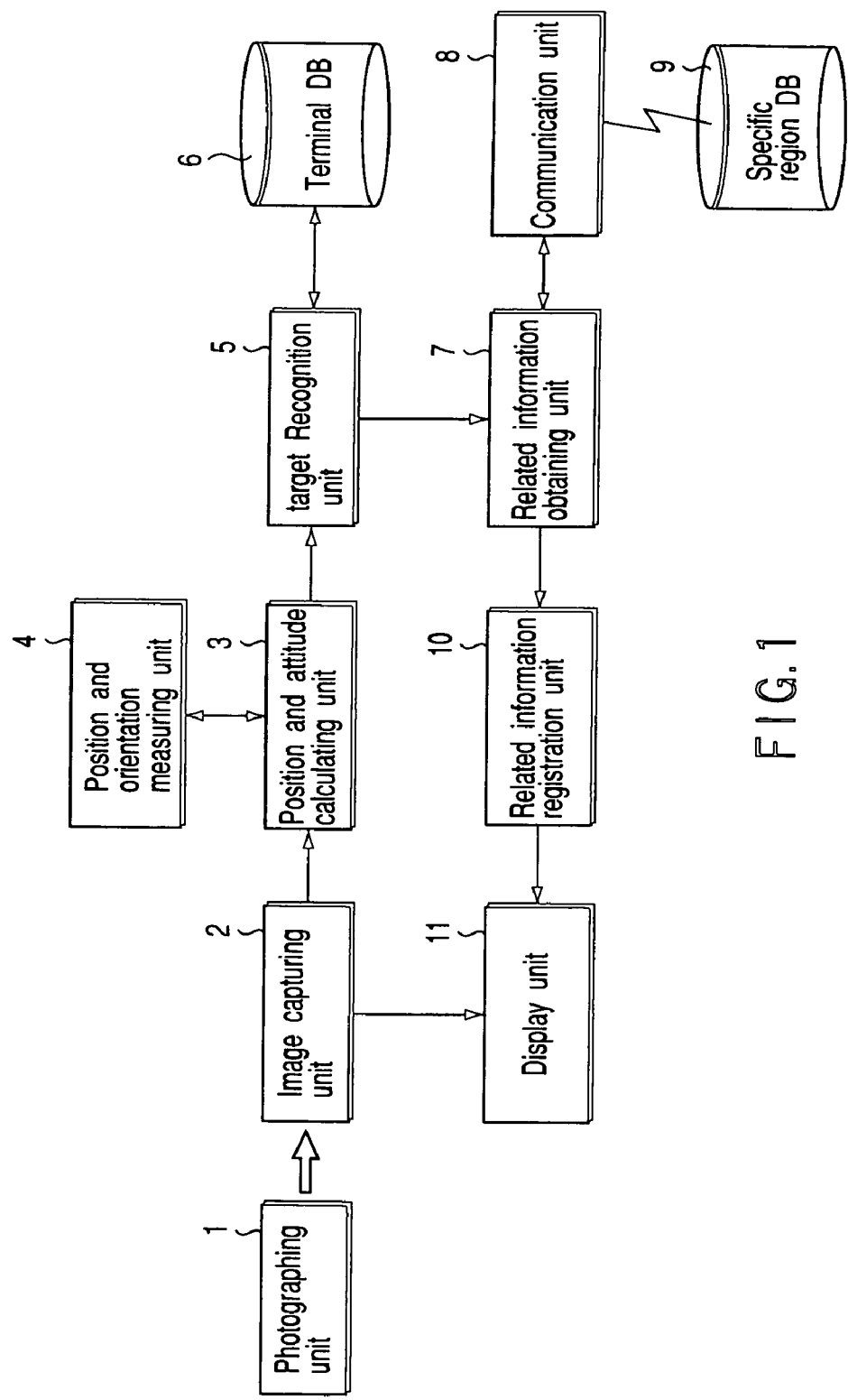
F I G. 1

SYSTEM FOR DISPLAYING INFORMATION IN SPECIFIC REGION

CROSS-REFERENCE TO RELATED APPLICATIONS

This application is based upon and claims the benefit of priority from the prior Japanese Patent Application No. 2000-283293, filed Sep. 19, 2000, the entire contents of which are incorporated herein by reference.

BACKGROUND OF THE INVENTION

1. Field of the Invention

The present invention relates to a system for displaying information in a specific region, the system being used in a specific region such as theme park, amusement park, shopping mall, or campus. The present system provides related information to support a personal action.

2. Description of the Related Art

Hitherto, various arts for superimposing guide information related to an image captured by a digital camera to display the image and information have been disclosed.

For example, Jpn. Pat. Appln. KOKAI Publication No. 10-267671 discloses an art having the following characteristics. That is, in the art, sight images are captured by a camera. On the basis of a camera position, a camera angle, a focal distance, and image size information in capturing, a view space is obtained in a map information space. Constructions in the view space are taken. Subsequently, the names and attributes of the constructions are formed as label information. The label information is superimposed on the sight image to be displayed.

Jpn. Pat. Appln. KOKAI Publication No. 11-031238 also discloses an art similar to the above.

In the related arts, however, the position and angle of capturing means, focal distance, image size information have to be stored into a storage unit. Accordingly, considering the errors and drift of a sensor, a correct position cannot be measured Furthermore, it is necessary that a capturing position be also correctly measurable to some extent. The application is limited. When an available region is wide, a database for information related to sight becomes enormous. Accordingly, a large capacity for recording is needed. When the available region is wide, for the same reason, a response speed is low. Considering that it takes time to determine a position, the accuracy is low.

BRIEF SUMMARY OF THE INVENTION

The present invention is made in consideration of the above problems. It is an object of the invention to provide a system for displaying information in a specific region, which has high accuracy and is robust and which can provide information with mostly real-time rate in a space within a limited range.

To accomplish the above object, as an embodiment of the present invention, there is provided a system for displaying information in a specific region including: an image capturing unit which captures an image of a subject captured by a capturing unit; a position and attitude calculating unit which calculates at least the position and the facing direction of the capturing unit on the basis of the image captured by the image capturing unit; a determining unit which determines a subject in the image captured by the image capturing unit on the basis of an output of the position and attitude calculating unit; a related information obtaining unit which obtains at least one of information related to the subject determined by the determining unit and information related to the position and the direction of a user calculated from the subject image; and a display unit which displays the information obtained by the related information obtaining unit together with the image related to the subject.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a system for displaying information in a specific region according to an embodiment of the present invention;

FIG. 4A is a view showing an example of a display state of a liquid crystal display unit 20a; and FIG. 4B is a view showing another example of the display state of the liquid crystal display unit 20a.

DETAILED DESCRIPTION OF THE INVENTION

Figure 2:
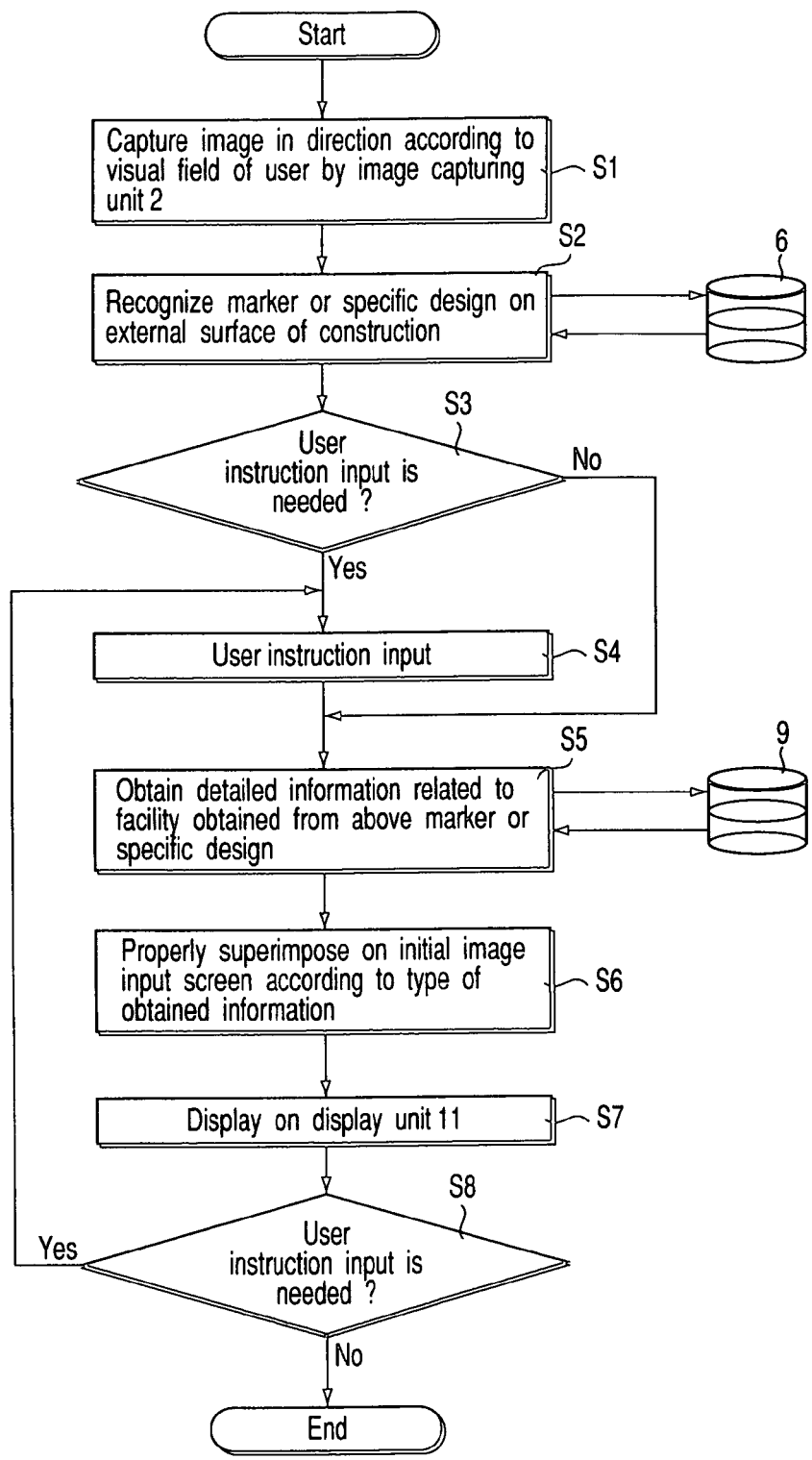
FIG. 2 is a flowchart showing the operation of the system for displaying information in a specific region according to the embodiment of the present invention.

An embodiment of the present invention will now be described hereinbelow with reference to the drawings.

FIG. 1 is a block diagram showing the configuration of a system for displaying information in a specific region according to an embodiment of the present invention. The configuration and operation will now be described in detail hereinbelow.

As shown in FIG. 1, an output of a capturing unit 1 is connected to an input of an image capturing unit (image processing unit) 2. An output of the image capturing unit 2 and an output of a position measuring unit 4 are connected to an input of a position and attitude calculating unit 3. An output of the position and attitude calculating unit 3 is connected to an input of a determining unit 5. An output of the determining unit 5 is connected to an input of a related information obtaining unit 7. The determining unit 5 is communicatably coupled to a terminal database 6. The related information obtaining unit 7 is communicatably connected to a specific region database 9 through a communication unit 8. An output of the related information obtaining unit 7 is connected to an input of a display unit 11 through a related information superimposition display unit 10.

In this case, capturing means corresponds to the capturing unit 1, image processing means corresponds to the, image capturing unit 2, position and attitude calculating means corresponds to the position and attitude calculating unit 3, determining means corresponds to the determining unit 5, related information obtaining means corresponds to the related information obtaining unit 7, and display means corresponds to the related information superimposing display unit 10 and the display unit 11. An internal information source including facilities in a specific region and space coordinates thereof corresponds to the terminal database 6 and an external information source including facilities in a specific region and explanatory guide information thereof corresponds to the specific region database 9. Position measuring means corresponds to the position measuring unit 4.

In the configuration, the capturing unit 1 is comprised of a CCD camera and photographs a desired subject. The image capturing unit 2 captures image information related to the subject captured by the capturing unit 1 as electric signals.

The position and attitude calculating unit 3 obtains the position and the facing direction of the capturing unit 1 on the basis of the image information captured by the image capturing unit 2.

In other words, the position and attitude calculating unit 3 utilizes a specific index included in the image, namely, predetermined marker information, or a characteristic portion of a specific scene included in the image to obtain the position and facing direction of the capturing unit 1.

As a method for obtaining the position and facing direction of the capturing unit 1, for example, a well-known method disclosed in Jpn. Pat. Appln. KOKAI Publication No. 227309/2000 can be used. Accordingly, the detailed description is omitted.

The position and attitude calculating unit 3 can also obtain the position of the present system on the basis of the output of the position measuring unit 4. In this case, the position measuring unit 4 uses a method for measuring a position with, for example, a GPS signal (C/A code, P code) or a method for measuring a position on the basis of the magnitude of a PHS (Personal Handy Phone System) signal radio wave, thereby obtaining the position of the system.

Consequently, the position of a system user is simply obtained and only the facing direction of is the system is calculated from the image. Therefore, it is effective in accomplishing the high-speed system operation with high accuracy.

The determining unit 5 receives the output of the position and attitude calculating unit 3 and properly accesses the terminal database 6 to determine a subject in the image. The terminal database 6 has stored information related to the facilities in the specific region and their space coordinates.

The related information obtaining unit 7 properly accesses the specific region database 9 through the communication unit 8 such as a cellular phone or a PHS in radio communication to obtain information related to the subject determined by the determining unit 5. The specific region database 9 has previously stored facilities in the specific region and their explanatory guide information.

The related information superimposition display unit 10 drives the display unit 11 to display the related information obtained by the related information obtaining unit 7 so as to be superimposed on the captured image, which has already been displayed on the display unit 11. In this manner, the information related to the subject in the image is superimposed on the captured image to be displayed on the display unit 11.

The flow of the operation of the system for displaying information in a specific region according to the embodiment of the present invention will now be described in detail with reference to a flowchart of FIG. 2.

The capturing unit 1 photographs an image in the direction according to the user's visual field. The image capturing unit 2 captures the image (step S1). Subsequently, the position and attitude calculating unit 3 obtains the position and facing direction of the capturing unit 1 on the basis of image information captured by the image capturing unit 2. On the basis of the information, the determining unit 5 properly refers to the terminal database 6, so that the subject in the image is recognized (step S2).

In this case, a marker or a specific design on the external surface of a construction is recognized.

When an instruction input by the user is needed, "various menus" are displayed. Accordingly, such a fact is suggested on the display unit 11 and the instruction input by the user is received (steps S3 and S4). For example, there are "structure inside information", "waiting time for event", "guide", and "various reservations".

Subsequently, the related information obtaining unit 7 obtains detailed information related to the facility obtained on the basis of the marker or specific design while properly communicating with the specific region database 9 through the communication unit 8 (step S5). The terminal database 6 has previously stored the list of space coordinates and corresponding facilities existing there.

In this instance, the specific region database 9 has previously stored event schedules of the facilities, facility detailed information (shops, commodity descriptions, and the like), congestion degree information, prices of commodities or services, various reservations, specific region geographical guide (navigation), and graphic data content related to them. Accordingly, the information corresponding to the determined subject can be obtained.

The related information superimposition display unit 10 performs a predetermined process to display the information so as to properly superimpose the information on an initial image input screen in accordance with the type of obtained information (step S6). The display unit 11 displays the superimposed image (step S7).

In this instance, the information type that denotes discrimination can be classified into graphic data such as structures or maps and text data such as prices.

At that time, graphic images such as entrance, restroom positions, and the like in a construction can be displayed so as to be superimposed on the external view (real picture) of the construction. Alternatively, the present congestion degree information, prices, and schedule can be linked to the subject with a balloon or a line so as not to hide the subject and can be displayed in a predetermined position on the periphery of the screen of the display unit 11.

Accordingly, when the instruction input by the user is needed, such a fact is suggested on the display unit 11 and the instruction input by the user is received (steps S8 and S4). The processes similar to the above are repeated and updated information (latest information) is always displayed while information indicative of the system completion or a request to acquire and display predetermined information is displayed as necessary.

The above-described system for displaying information in a specific region according to the embodiment of the present invention comprises: a capturing device such as a video camera or a CCD camera; a personal portable terminal device such as a notebook-sized personal computer; and a communication device for realizing connection over the Internet through, e.g., a PHS.

Figure 3:
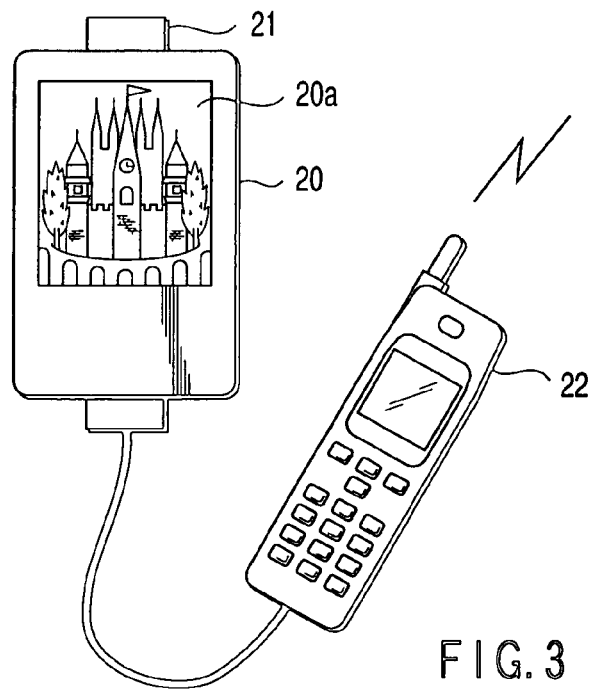
FIG. 3 is an external view of the system for displaying information in a specific region according to the embodiment of the present invention.

In this instance, FIG. 3 illustrates the configuration of the system for displaying information in a specific region according to the embodiment. The description will now be made. The system for displaying information in a specific region according to the example comprises: a PDA (personal Digital Assistant) 20 serving as a personal portable terminal device, on which a CCD camera 21 serving as a capturing device is mounted; and a cellular phone 22 as a communication device.

The CCD camera 21 corresponds to the capturing unit 1 in FIG. 1. The PDA 20 has the functions of the image capturing unit 2, position and attitude calculating unit 3, position measuring unit 4, determining unit 5, terminal database 6, related information obtaining unit 7, related information superimposition display unit 10, and display unit 11 therein. The cellular phone 22 corresponds to the communication unit 8.

In this configuration, in a limited specific region such as a theme park, the CCD camera 21 captures a design or a marker formed on the construction existing in the region. The PDA 20 calculates the position of the CCD camera 21, that is, the position of the user on the basis of the size of the design or marker and the distortion of the form. Simultaneously, a database of the theme park is accessed over the Internet through the cellular phone 22. Due to the access, constructional information according to the present position and facing direction of the user is obtained in real time. The constructional information is superimposed on the image to be displayed on a screen 20a.

Figure 4A:
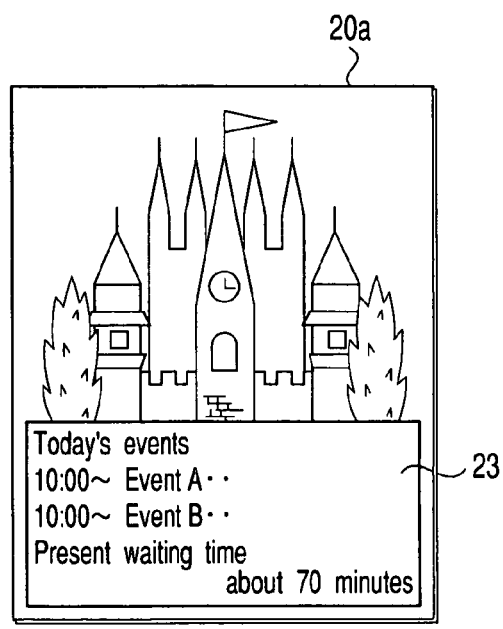
Figure 4B:
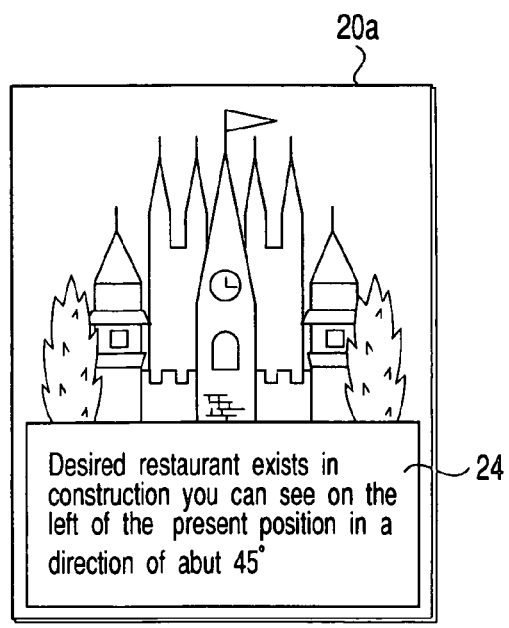

FIGS. 4A and 4B are views each showing an example of a superimposition display on the screen 20a.

FIG. 4A illustrates the example in which event information related to a determined construction is superimposed on an image to be displayed. As shown in FIG. 4A, a window 23 displays a schedule regarding events to be performed in the construction and the present waiting time on the image of the construction. In addition, various reservation circumstances and the prices of commodities or services can be also displayed.

FIG. 4B illustrates the example in which predetermined information is superimposed on the image to be displayed in order to lead the way from the determined construction to a desired place on the basis of the position and attitude of the user (exactly, the terminal of the present system) as a base point. In the system for displaying information in a specific region according to the embodiment of the present invention, since the present position and the facing direction of the user are inputted as information, guiding to a construction a little distance away from the base point can be properly accomplished so long as the information of the specific region database is properly referred to.

In this example, a window 24 submits a guide describing that "A desired restaurant exists in a construction you can see on the left of the present position in a direction of about 45°". As mentioned above, even in an unknown place, many users can obtain extra information not normally shown on a map, similar to that obtained by making an inquiry in person.

The above-mentioned present invention has the following advantages.

Generally, a position determining system with the GPS or PHS can only determine a position at an accuracy of 10 to tens of meters. In addition, the system cannot recognize the facing direction of the user. Accordingly, a construction or sight the user sees cannot be determined. However, when a method for capturing and analyzing an image like the method of the present invention is used, it is extremely easy to determine a subject which the user is interested in (the user aims an image input device to) at that time and to retrieve information on the basis of the determination.

In the related art, although a sight image is graphically captured and a camera position is estimated on the basis of the image form, the landscape of a town is easily changed because a construction is rebuilt or redecorated and it is remarkably difficult to completely update the corresponding database. Even when it can be accomplished, the cost is high. According to the present invention though, as to constructions in a specific theme park, a marker which can be recognized as an image or a design having the similar function, which is added to each construction, is recognized as an image, so that the construction or facility serving as a subject can be determined directly. Furthermore, computation is remarkably simple. It can be said that the system maintenance is inexpensive.

Although the embodiment of the present invention has been described, it is a matter of course that the present invention is not limited to the embodiment, and many modifications or variations are possible within the spirit and scope. For example, although the above embodiment has been described with respect to the example in which the PDA was used as a personal information portable terminal device, it is not limited to the device, as a notebook-sized personal computer or cellular phone could also be used.

As mentioned above, according to the present invention, the system for displaying information in a specific region, which has high accuracy and is robust and which can provide information with high real-time properties in a space of a limited range, can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for displaying information in a specific region, comprising:
   an image processing unit which acquires and processes an image of a subject captured by a capturing unit;
   a position and attitude calculating unit which calculates at least a position and a facing direction of the capturing unit based on the image acquired by the image processing unit by utilizing at least one of predetermined marker information and a characteristic portion of a specific scene included in the image;
   a determining unit which determines a subject in the image acquired by the image processing unit based on an output of the position and attitude calculating unit;
   a related information obtaining unit which obtains information including at least one of information related to the subject in the image and information related to a position and direction of a user; and
   a display unit which displays information obtained by the related information obtaining unit together with the image of the subject;
   wherein at least the image processing unit and the related image obtaining unit are accommodated in a portable terminal system; and
   wherein the information obtained by the related information obtaining unit is obtained from an external information source provided separately from the portable terminal system, and the related information obtaining unit accesses the external information source to obtain the information.

2. The system according to claim 1, wherein the determining unit accesses information in an internal information source provided in the portable terminal system to determine the subject, and the internal information source contains information relating to facilities in the specific region and location coordinates thereof.

3. The system according to claim 1, wherein the external information source includes information relating to facilities in the specific region and explanatory guide information thereof, and the related information obtaining unit accesses the external information source to obtain the explanatory guide information.

4. The system according to claim 1, wherein the related information obtaining unit accesses the external information source by radio communication.

5. The system according to claim 1, further comprising a position measuring unit for measuring the position of the portable terminal system.

6. The system according to claim 5, wherein the position measuring unit measures the position of the portable terminal system with a GPS signal.

7. The system according to claim 5, wherein the position measuring unit measures the position of the portable terminal system with a PHS signal radio wave.

8. The system according to claim 1, wherein the specific region includes a theme park.

9. The system according to claim 1, wherein the related information obtaining unit accesses the external information source via the internet.

10. A system for displaying information in a specific region, comprising:

image processing means for acquiring and processing an image of a subject captured by capturing means for capturing the image of the subject;

position and attitude calculating means for calculating at least a position and a facing direction of the capturing means based on the image acquired by the image processing means by utilizing at least one of predetermined marker information and a characteristic portion of a specific scene included in the image;

determining means for determining a subject in the image acquired by the image processing means based on an output of the position and attitude calculating means;

related information obtaining means obtains information including at least one of information related to the subject determined in the image and information related to a position and a direction of a user; and display means for displaying information obtained by the related information obtaining means together with the image of the subject;

wherein at least the image processing means and the related image obtaining means are accommodated in a portable terminal system; and wherein the information obtained by the related information obtaining means is obtained from an external information source provided separately from the portable terminal system.

* * * * *

UNITED STATES PATENT AND TRADEMARK OFFICE
CERTIFICATE OF CORRECTION

PATENT NO. : 7,088,389 B2
APPLICATION NO. : 09/951872
DATED : August 8, 2006
INVENTOR(S) : Takao Shibasaki et al.

Page 1 of 1

It is certified that error appears in the above-identified patent and that said Letters Patent is hereby corrected as shown below:

Title Page

Under Item (75) Inventors:

change "Yulchiro Akatsuka, Tama (JP)"

to -- Yuichiro Akatsuka, Tama (JP) --.

Signed and Sealed this

Twelfth Day of December, 2006

JON W. DUDAS
*Director of the United States Patent and Trademark Office*